(12) United States Patent
Kim

(10) Patent No.: US 8,007,160 B2
(45) Date of Patent: Aug. 30, 2011

(54) DISPLAY DEVICE, IMAGE FORMING APPARATUS HAVING THE SAME, AND LIGHT GUIDE FOR DISPLAY DEVICE

(75) Inventor: Kyung Rok Kim, Seongnam-Si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 228 days.

(21) Appl. No.: 12/367,895

(22) Filed: Feb. 9, 2009

(65) Prior Publication Data
US 2009/0262553 A1    Oct. 22, 2009

(30) Foreign Application Priority Data

Apr. 22, 2008  (KR) .................. 10-2008-0037063

(51) Int. Cl.
*F21V 7/04* (2006.01)

(52) U.S. Cl. ......... 362/621; 362/327; 362/619; 362/628

(58) Field of Classification Search ............... 362/237, 362/240, 241, 242, 243, 244, 245, 246, 327, 362/329, 333, 617, 619, 620, 621, 628
See application file for complete search history.

(56) References Cited

U.S. PATENT DOCUMENTS

| | | | |
|---|---|---|---|
| 4,714,983 A * | 12/1987 | Lang | 362/621 |
| 7,194,185 B2 * | 3/2007 | Watanabe | 362/628 |
| 7,207,706 B2 | 4/2007 | Leu et al. | |
| 7,470,051 B2 * | 12/2008 | Godo | 362/628 |
| 2004/0012959 A1 * | 1/2004 | Robertson et al. | 362/240 |
| 2006/0268578 A1 * | 11/2006 | Zhu et al. | 362/619 |
| 2007/0171678 A1 * | 7/2007 | Shim et al. | 362/617 |
| 2007/0252163 A1 * | 11/2007 | Kuan et al. | 362/246 |

* cited by examiner

*Primary Examiner* — Y My Quach Lee
(74) *Attorney, Agent, or Firm* — Stanzione & Kim, LLP

(57) ABSTRACT

Disclosed are a light guide which distributes light, transmitted from a light source, uniformly to a light emission surface of the light guide, and a display device and an image forming apparatus using the light guide. The light guide includes a light incidence part having a diffusion structure diffusing light, a reflecting surface reflecting the light diffused by the diffusion structure to reduce a light loss from the light guide, and a light guide part guiding light between the light incidence part and the light emission part.

23 Claims, 12 Drawing Sheets

DISPLAY DEVICE, IMAGE FORMING APPARATUS HAVING THE SAME, AND LIGHT GUIDE FOR DISPLAY DEVICE

CROSS-REFERENCE TO RELATED APPLICATION

This application claims the benefit of Korean Patent Application No. 2008-0037063, filed on Apr. 22, 2008 in the Korean Intellectual Property Office, the disclosure of which is incorporated herein by reference.

BACKGROUND OF THE INVENTION

1. Field of the Invention

The present invention relates to a light guide guiding light emitted from a light source, and more particularly, to an improved light guide, a display device and an image forming apparatus employing the same.

2. Description of the Related Art

Various electronic products have display devices for informing users of the product's operating state. These display devices are often found on image forming apparatuses, such as, e.g., printers, copying machines, fax machines, and multi-function machines, or the like.

Generally, a display device includes a light source and a light guide. When the function or operation of the electronic product changes, power is supplied to the light source or the amount or color of light emitted from the light source is changed. The light guide transmits light from the light source to the external display through a light emission surface, thereby communicating the change of the state of the instrument to a user.

In order to allow the user to easily recognize the light of the display device, light guided by the light guide should be distributed uniformly on the light emission surface of the light guide. When light is concentrated upon a specific region of the light emission surface of the light guide, the viewing angle at which the user perceives the light may be narrowed, and the amount of light incident upon a user's visual field is not uniform.

Prior attempt to improve uniformity includes scattering of diffusion material throughout the entire area of the light guide so as to disperse light within the light guide. While such a method may achieves a uniform distribution of light on the light emission surface of the light guide, it unfortunately may result in a substantial loss of light during diffusion of light, and thus greatly reduces the amount of light reaching the light emission surface of the light guide. To compensate for the loss of light, additional light sources may be employed, resulting in an increase of material costs and the power consumption of the display device.

BRIEF DESCRIPTION OF THE DRAWINGS

Various aspects and advantages of the embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
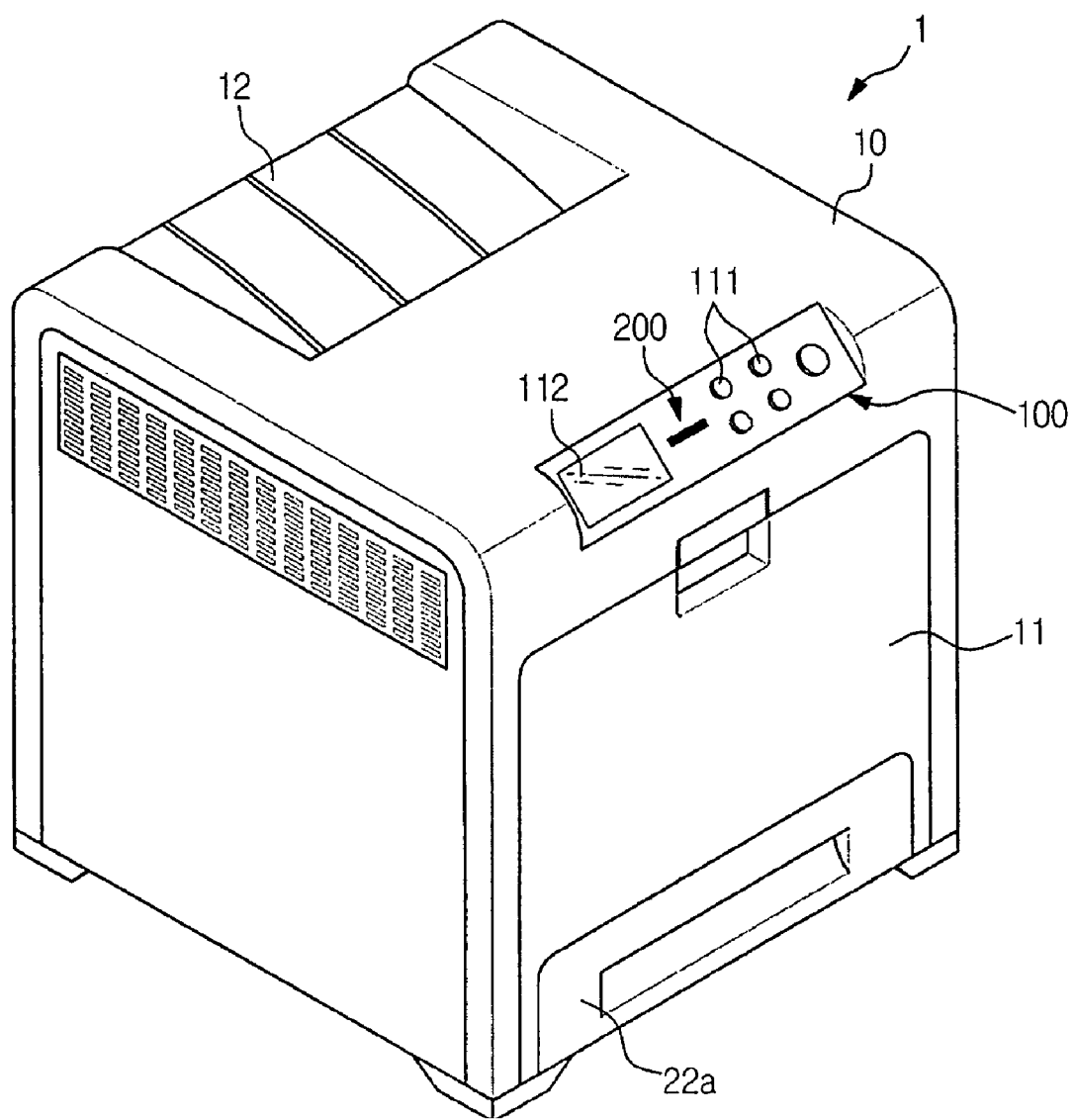
FIG. 1 illustrates the external appearance of an image forming apparatus according to one embodiment of the invention.

Reference will now be made in detail to exemplary embodiments of the present invention, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale, and may be exaggerated for the sake of allowing greater understanding.

Figure 2:
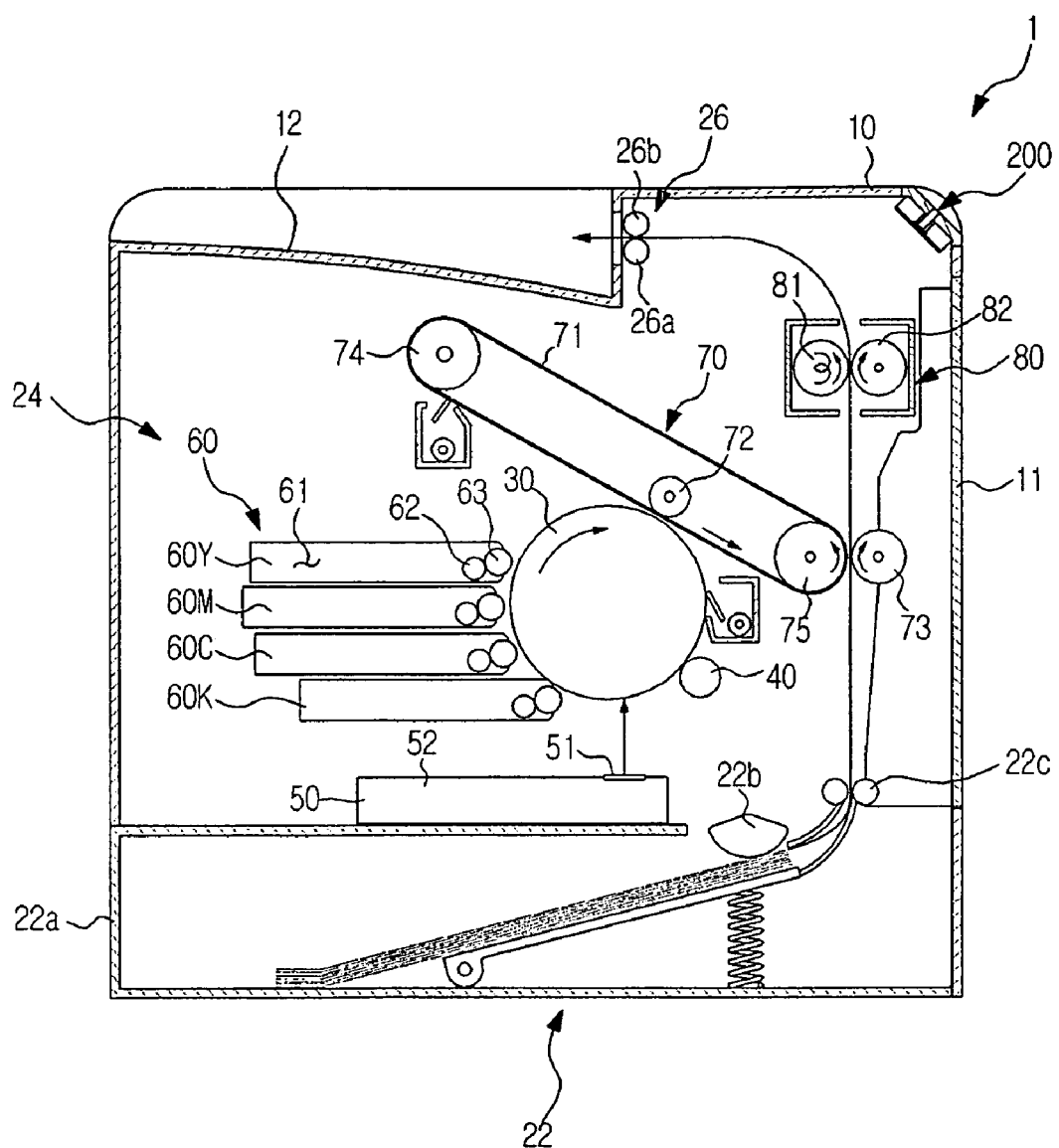
FIG. 2 illustrates the internal structure of an image forming apparatus in accordance with one embodiment of the invention.

FIGS. 1 and 2 are views respectively illustrating the external appearance and the constitution of an image forming apparatus in accordance with one embodiment of the invention.

As shown in FIG. 1, in one embodiment of the invention, an image forming apparatus may include a main body 10, which defines the external appearance of the image forming apparatus 1, and which supports therein various components of the image forming apparatus 1. A main body cover 11 may be rotatably or otherwise movably connected to the main body 10. The main body cover 11 may allow access to the parts in the main body 10 and/or allow a user to remove papers jammed in the main body 10.

A paper feed cassette 22a may be detachably connected to the main body 10. The paper feed cassette 22a may store papers for use in an image forming operation. A paper exit tray 12 may be provided on the main body 10. In one embodiment of the invention, operation of the image forming apparatus may cause papers supplied from the paper feed cassette 22a to go through a printing process in the main body 10 and be discharged to the paper exit tray 12 on the outside of the main body 10.

As shown in FIG. 2, the image forming apparatus 1 may further include a paper feeding device 22, a printing device 24, and a paper discharging device 26. The printing device 24 may include a photoconductor 30, a charging unit 40, a light scanning unit 50, a developing device 60, a transfer unit 70, and a fixing unit 80.

The paper feeding device 22 supplies papers to the printing device 24. The paper feeding device 22 may include a paper feed cassette 22a, a pick-up roller 22b, which picks up papers (S) stored in the paper feed cassette 22a sheet by sheet, and a feed roller 22c, which feeds the picked-up papers to the transfer unit 70.

The charging unit 40 may charge the photoconductor 30 with a designated potential, and the light scanning unit 50 may irradiate light corresponding to image data onto the charged photoconductor 30, thus forming an electrostatic latent image on the surface of the photoconductor 30. The light scanning unit 50 may include a housing 52 having a light transmission member 51 which emits light outside of the light scanning unit 50, and a scanning optical system (not shown) installed in the housing 52.

The developing device 60 may supply developing agents to the photoconductor 30, on which the electrostatic latent image is formed. The developing device 60 includes four developing units 60Y, 60M, 60C, and 60K, which respectively contain developing agents having different colors. In one embodiment, for example, the colors may be yellow (Y), magenta (M), cyan (C), and black (K).

Each of the developing units 60Y, 60M, 60C, and 60K may include a developing agent storing part 61, a supply roller 62, and a developing roller 63. The developing agent storing part 62 stores a developing agent to be supplied to the photoconductor 30, and the supply roller 62 supplies the developing agent to the developing roller 63. The developing roller 63 attaches the developing agent to the surface of the photoconductor 30, on which an electrostatic latent image is formed, thereby forming a visible image.

The transfer unit 70 may include an interim transfer belt 71, a first transfer roller 72, and a second transfer roller 73.

The interim transfer belt 71 may be supported by support rollers 74 and 75. In one embodiment of the invention, the interim transfer belt 71 travels at a velocity similar to the linear velocity of the photoconductor 30. The first transfer roller 72 may oppose the photoconductor 30, the interim transfer belt 71 being interposed between the first transfer roller 72 and the photoconductor 30, to cause the visible image formed on the photoconductor 30 to be transferred to the interim transfer belt 71.

The second transfer roller 73 may oppose the support roller 75 with the interim transfer belt 71 being interposed between the second transfer roller 73 and the support roller 75. The second transfer roller 73 may be separated from the interim transfer belt 71 while the image is being transferred from the photoconductor 30 to the interim transfer belt 71, and contacts the interim transfer belt 71 when the image on the photoconductor 30 is transferred to the interim transfer belt 71. When the second transfer roller 73 contacts the interim transfer belt 71, the image on the interim transfer belt 71 may be transferred to a paper or other printing medium.

The fixing unit 80 may include a heating roller 81 having a heat source, and a pressing roller 82 opposing the heating roller 81. When paper passes through a gap between the heating roller 81 and the pressing roller 82, the image is fixed to the paper by heat transmitted from the heating roller 81 and/or the pressure applied between the heating roller 81 and the pressing roller 82.

The paper discharging device 26 may include an exit roller 26a and an exit backup roller 26b, and discharges the paper passed through the fixing device 80 to the paper exit tray 12 of the main body 10.

An example of the operation of the above described embodiment of image forming apparatus will now be briefly described.

When a printing operation is started, the surface of the photoconductor 30 may be uniformly charged by the charging unit 40. The light scanning unit 50 may irradiate light according to image of any one color, for example, light corresponding to yellow image data, onto the surface of the uniformly charged photoconductor 30, thereby forming an electrostatic latent image corresponding to the yellow image on the photoconductor 30.

A developing bias power supply may be applied to the developing roller 63 of the yellow developing unit 60Y, which may cause a yellow developing agent to adhere to the electrostatic latent image, forming a yellow visible image on the photoconductor 30. This visible image may be transferred to the interim transfer belt 71 by the first transfer roller 72.

When the transfer of the first color, e.g., the yellow color image in the above example, has been completed, the light scanning unit 50 may irradiate light of another color, for example, light corresponding to magenta image data, onto the surface of the photoconductor 30, forming an electrostatic latent image corresponding to a magenta image on the photoconductor 30. The magenta developing device 60M may supply a magenta developing agent to the electrostatic latent image, forming a magenta visible image on the photoconductor 30. The magenta visible image may be transferred to the interim transfer belt 71 by the first transfer roller 72. One visible image may be overlapped with another visible image. For example, the magenta visible image may be overlapped with the yellow visible image.

This process may be performed for a plurality of colors. For example, in one embodiment of the invention, when the cyan developing device 60C and the black developing device 60K perform the above-described process after the yellow developing device 60Y and the magenta developing device 60M, a color image, obtained by overlapping the yellow, magenta, cyan, and black images, is completed on the interim transfer belt 71. The completed color image may be transferred to a printing medium, e.g., a sheet of paper, as it passes through a gap between the interim transfer belt 71 and the second transfer roller 73. The paper may then be discharged to the outside of the main body 10 via the fixing unit 80 and the paper discharging device 26.

Figure 3:
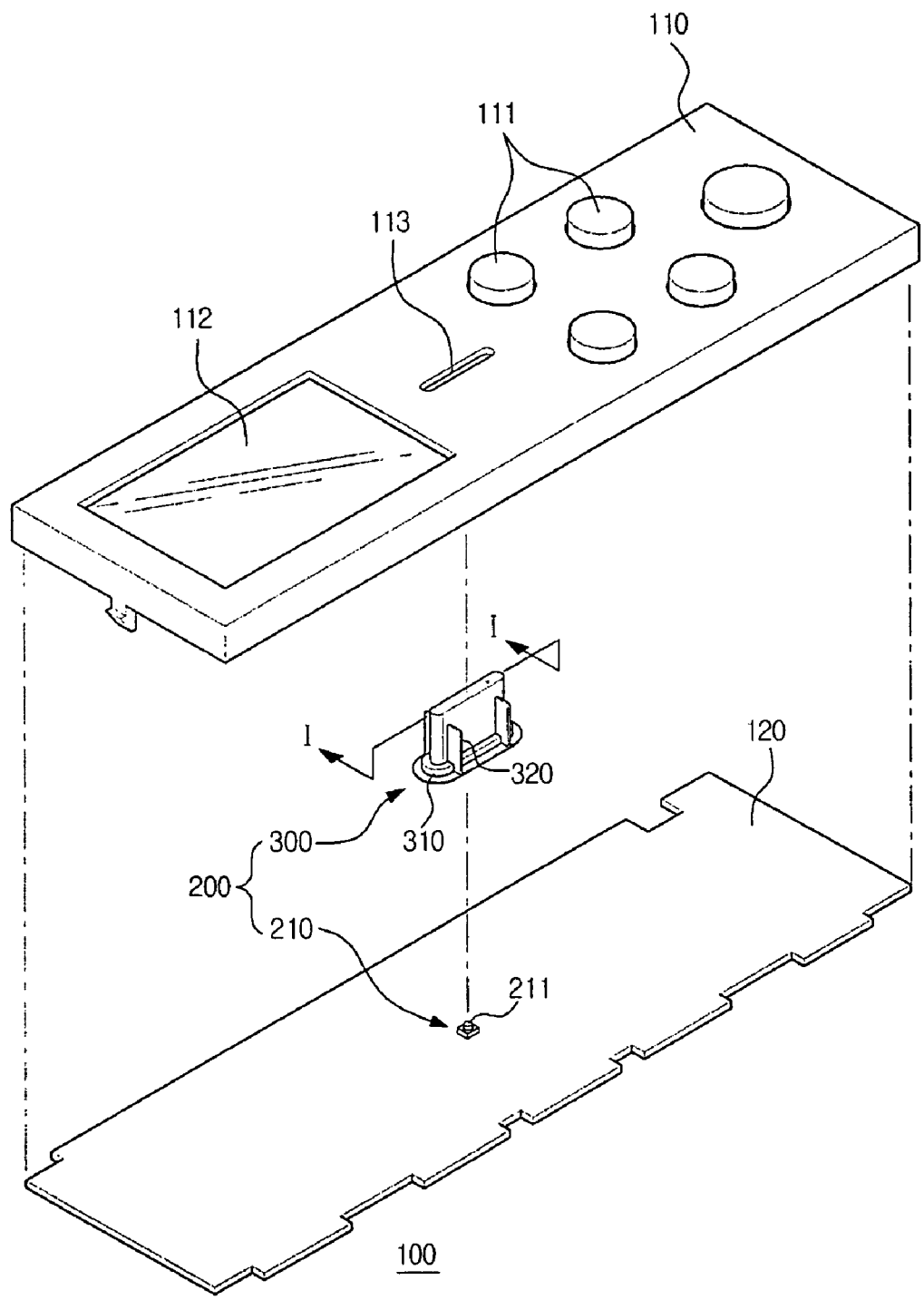
FIG. 3 is a perspective view illustrating a control panel assembly including a display device in accordance with one embodiment of the invention.

As shown in FIGS. 1 and 3, according to one embodiment, an image forming apparatus 1 may include a control panel assembly 100 installed on the main body 10.

As shown in FIG. 3, the control panel assembly 100 may include a control panel 110, a circuit board 120, and a display device 200, which displays information to a user. The circuit board 120 may be disposed on the inside of the control panel 110

The control panel 110 may include control buttons 111 or another control apparatus. The control buttons 111 may allow a user to control the operation of the image forming apparatus 1. The control panel 110 may also include a display window 112, which may display various data to a user through texts, signals, pictograms, or the like.

The circuit board 120 may comprise electronics (not shown) to facilitate the display of data regarding the image forming apparatus 1 to a user, and may also comprise various other electric and electronic parts for controlling various other operations of the image forming apparatus.

The display device 200 may include a light source 210 and a light guide 300. The light source 210 may be installed in the main body 10, and the light guide 300 may guide light emitted from the light source 210 toward the outside of the main body 10.

The display device 200 may display the operating state of the image forming apparatus 1, or other information. In one embodiment of the invention, the display device 200 may convey information through the change of the state of the light source 210. For example, the display device 200 may display whether or not the image forming apparatus 1 is operating normally through the turning-on/off of the light source 210, the variation of the amount of light, the variation of color, or other variations. As an another example, the display device 200 may display operating modes of the image forming apparatus 1, for example, a power-saving mode, warm-up mode, or printing mode. In another example, the display device 200 may display whether or not a paper jam is present within the image forming apparatus 1.

The light source 210 may be a point light source, such as an LED 211, or another type of light source. The light source 210 may be mounted on the circuit board 120.

Figure 4:
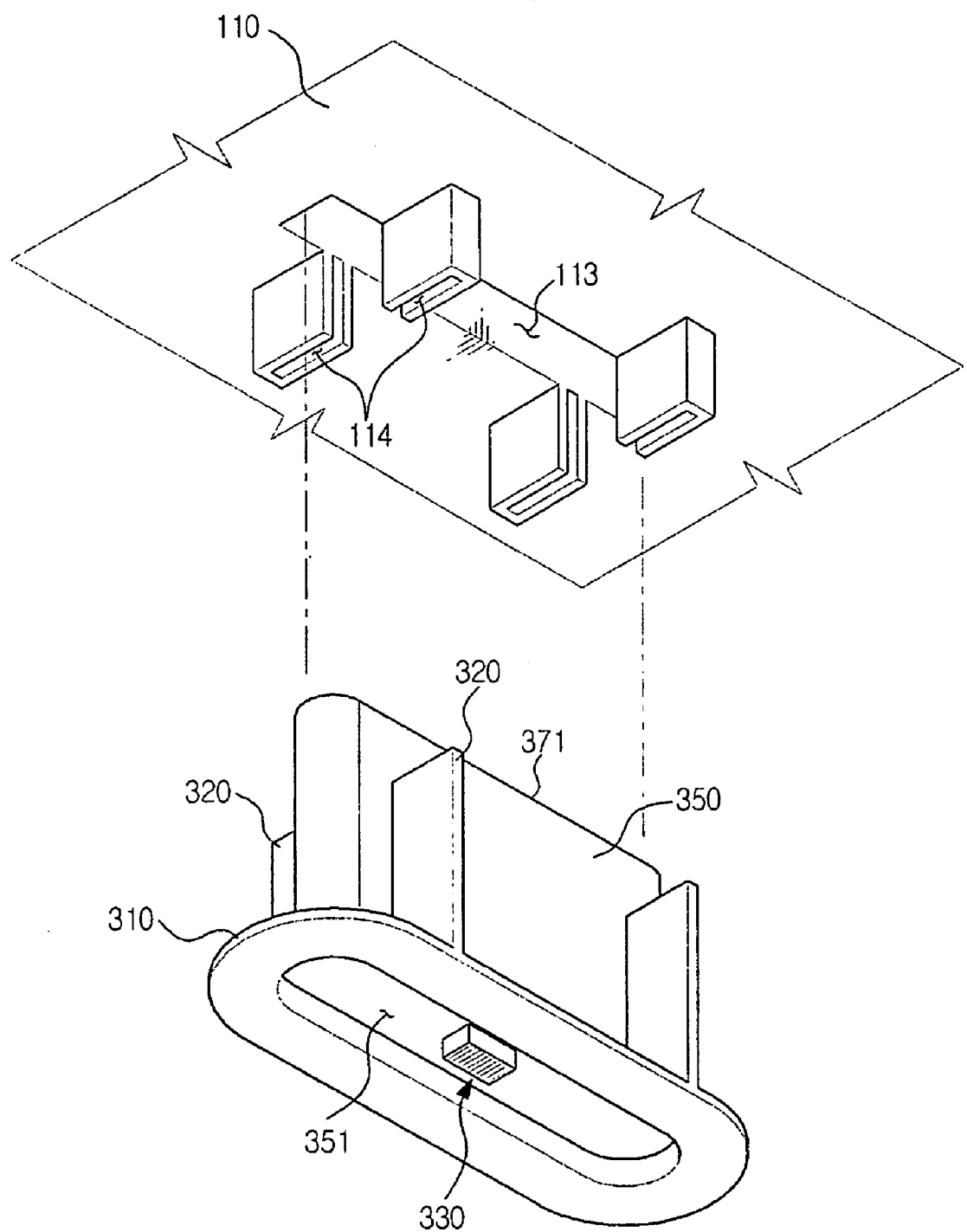
FIG. 4 is a perspective view of a relevant portions of FIG. 3.

In one embodiment of the invention, as shown in FIGS. 3 and 4, one end of the light guide 300 may be disposed on the light source 210, and the other end of the light guide 300 may be inserted into a display hole 113 formed in the control panel 110. The light guide 300 may include a support part 310 disposed along the circuit board 120, and fixing parts 320 fixed to the lower surface of the control panel 110. The fixing parts 320 of the light guide 300 may have a rib shape, and may be connected to corresponding fixing grooves 114 formed on the lower surface of the control panel 110. The light guide may also be fixed in place by other suitable means.

In another embodiment of the invention, the display device 200 may be installed directly in the main body 10 of the image forming apparatus 1. In this case, a display hole for exposing the light guide 300 to the outside of the main body 10 may be formed through the main body 10.

Figure 5:
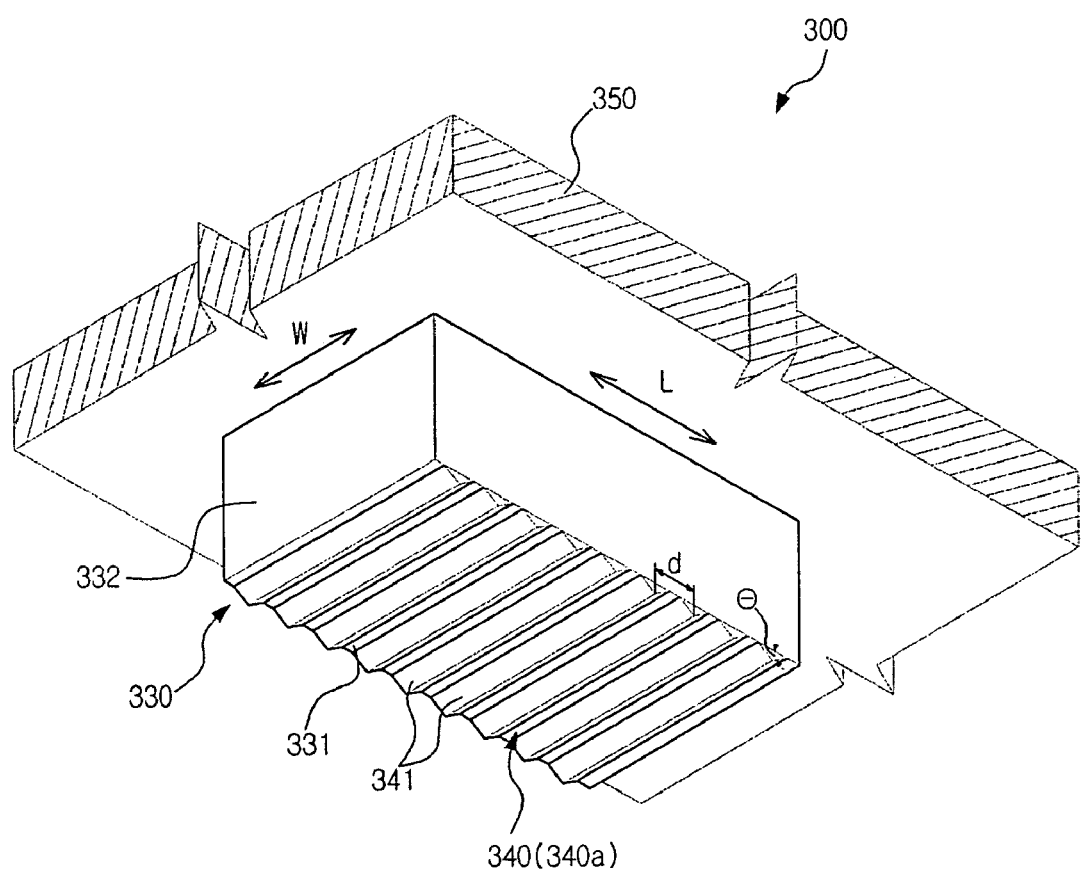
FIG. 5 is an enlarged perspective view of a portion of FIG. 4.
Figure 6:
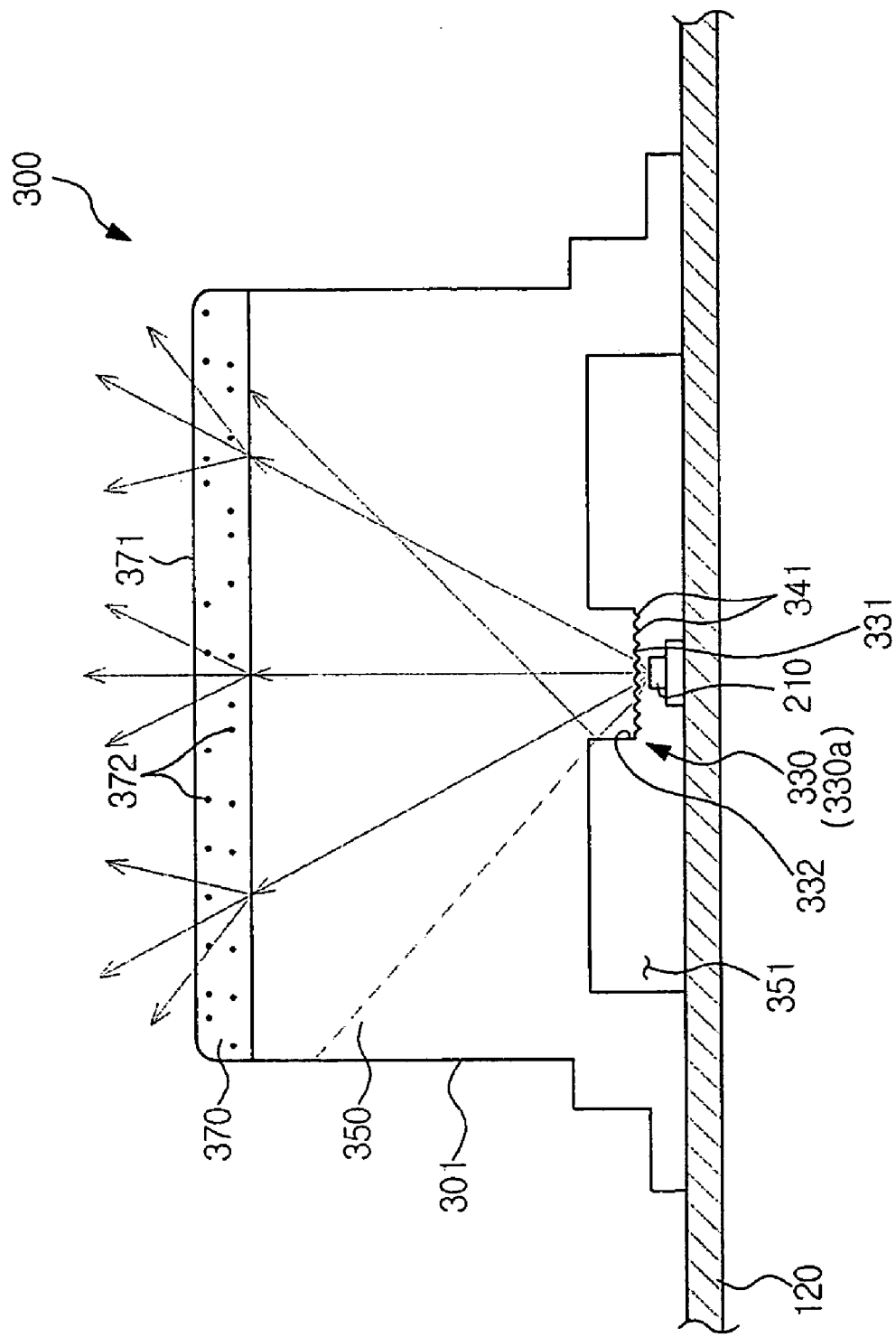
FIG. 6 is a cross-sectional view of a light guide according to one embodiment of the invention, taken along the line I-I of FIG. 3.

In one embodiment, as shown in FIGS. 5 and 6, the light guide 300 may include a light incidence part 330 having a light incidence surface 331, upon which light irradiated from the light source 210 is incident, a light guide part 350, which guides light transmitted from the light incident part 330, and a light emission part 370, which emits light transmitted from the light guide part 350 to the outside of the light guide 300.

The light incidence part 330, the light guide part 350, the light emission part 370, the support part 310, and the fixing parts 320 of the light guide 300 may be formed integrally using a transparent acrylic resin, such as, e.g., polymethyl methacrylate, or a transparent synthetic resin, such as polycarbonate or polystyrene, or another suitable material.

The light incidence part 330 may include a diffusion structure 340 for diffusing light incident upon the light guide 300, and a reflecting surface 332 for reflecting the light diffused by the diffusion structure 340.

The diffusion structure 340 may diffuse incident light such that the light can be distributed uniformly on a light emission surface 371 of the light guide 300. The reflecting surface 332 may reflect the light, which is diffused by the diffusion structure 340, and which travels toward a side surface 301 of the light guide 300, to the light emission surface 371, thus reducing a loss of the light to the outside of the side surface 301 of the light guide 300.

The light incidence part 330 may further include a protruding wall 330a protruding from the light guide part 350 toward the light source 210. A recess 351 for receiving the protruding wall 330a may be formed in the light guide part 350.

The lower surface of the protruding wall 330a may face, in an opposing manner, the light source 210, and may serve as a light incidence surface 331. A side surface of the protruding wall 330a extending from the lower surface of the protruding wall 330a to the light guide part 350 may serve as a reflecting surface 332.

A diffusion pattern 340a may be formed on the light incidence surface 331 of the light guide 300. The diffusion pattern 340a diffracts and/or diffuses the incident light in various directions. In an embodiment depicted in FIG. 5, the diffusion pattern 340a is obtained by disposing prism-shaped fine patterns 341, extended in the widthwise direction (W direction) of the light guide 300, at intervals, preferably at regular intervals, in the lengthwise direction (L direction) of the light guide 300.

Light may be distributed uniformly on the light emission surface 371 through properly adjusted of an angle ($\theta$) and an interval (d), where $\theta$ is an angle between the prism-shaped fine patterns 341 and the lower surface of the protruding wall 330a, and d is an interval between the neighboring fine patterns 341. These adjustments may be made by simulation or otherwise empirically to enable a uniform distribution of light on the light emission surface 371.

The light guide part 350 may be extended to the outside of the main body 10. The light guide part 350 may guide light between the light incidence part 330 and the light emission part 370.

The light emission part 370 may emit light transmitted from the light guide part 350 to the outside of the main body 10 so that an observer can recognize the light. The light emission surface 371 of the light emission part 370 may be exposed to the outside of the main body 10 through the display hole 113 formed on the control panel 110.

The light emission part 370 may have a designated thickness, and may have optical characteristics differing from those of the light guide part 350, allowing it to diffuse the light transmitted from the light guide part 350. The further diffusion of the light by the light emission part 370 may enhance the uniformity of light distribution when the light is emitted from the light emission surface 371.

As shown in FIG. 6, according to an embodiment, a diffusion agent 372 for diffusing light may be dispersed in the light emission part 370. For example, Titanium dioxide ($TiO_2$), silicon dioxide ($SiO_2$), or another suitable material may be used as the diffusion agent 372. Generally, light distribution on the light emission surface 271 becomes more uniform as the height of the light emission part 370 is increased. However, as the height of the light emission part 370 is increased, the light transmission efficiency of the light guide 300 is generally lowered and the amount of the light emitted from the light emission surface 371 is generally reduced. Preferably, thus, the height of the light emission part 370 containing the diffusion agent 372 is chosen taking into consideration of the light transmission efficiency characteristics of the light guide 300.

When, according to an embodiment, the light guide part 350 and the light emission part 370 have different optical characteristics, as described above, the light guide 300 may be, e.g., obtained by double injection molding. For example, the light incidence part 330 and the light guide part 350 may be formed by injection molding using a transparent polymer, and the light emission part 370 containing the diffusion agent 372 may be formed by separate injection molding, preferably subsequent to the injection molding of the light guide part 350.

Figure 7:
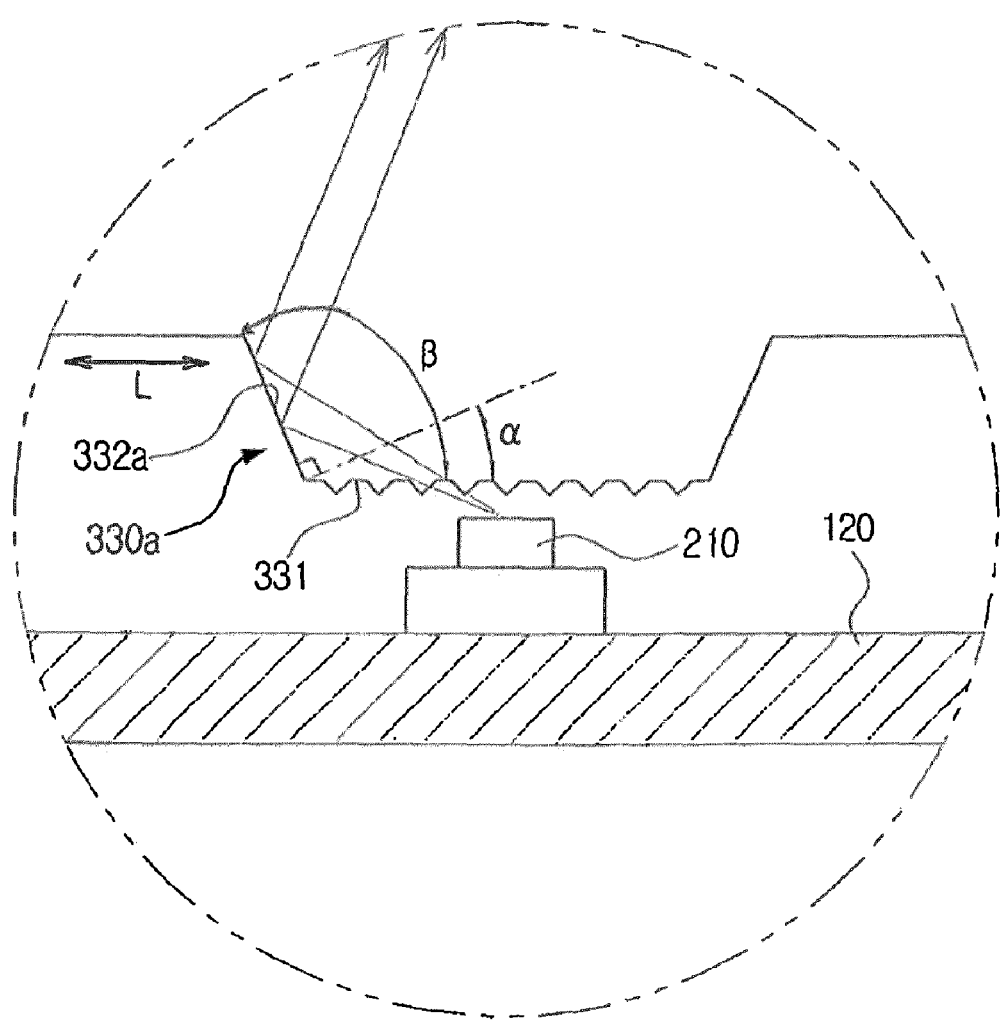
FIG. 7 illustrates a modification of a protruding wall of a light guide according to one embodiment of the present invention.

FIG. 7 is a view illustrating an embodiment, in which the protruding wall of the light guide has been modified. As shown in FIG. 7, a reflecting surface 332a of a protruding wall 330a may be inclined to form an obtuse angle with the light incidence surface 331. When the reflecting surface 332a is inclined, the reflecting surface 332a may reflect light inclined in the lengthwise direction (L direction) of the light guide 300 after the light is diffused by the diffusion pattern 340a. This may further reduce loss of light to the outside of the side surface of the light guide 300.

More specifically, in one embodiment of the invention the angle (β) between the light incidence surface 331 and the reflecting surface 332a is larger than or equal to the sum total of the critical angle (α), at which total reflection is generated on the reflecting surface 332a, and an angle of 90°. When the angle of inclination of the reflecting surface 332a is determined, light incident upon the reflecting surface 332a is substantially completely reflected by the reflecting surface 332a, and directed toward the light emission surface 371. This may reduce a loss of the light through the side surface 301 of the light guide 300 due to the transmission of light on the reflecting surface 332a.

Figure 8A:
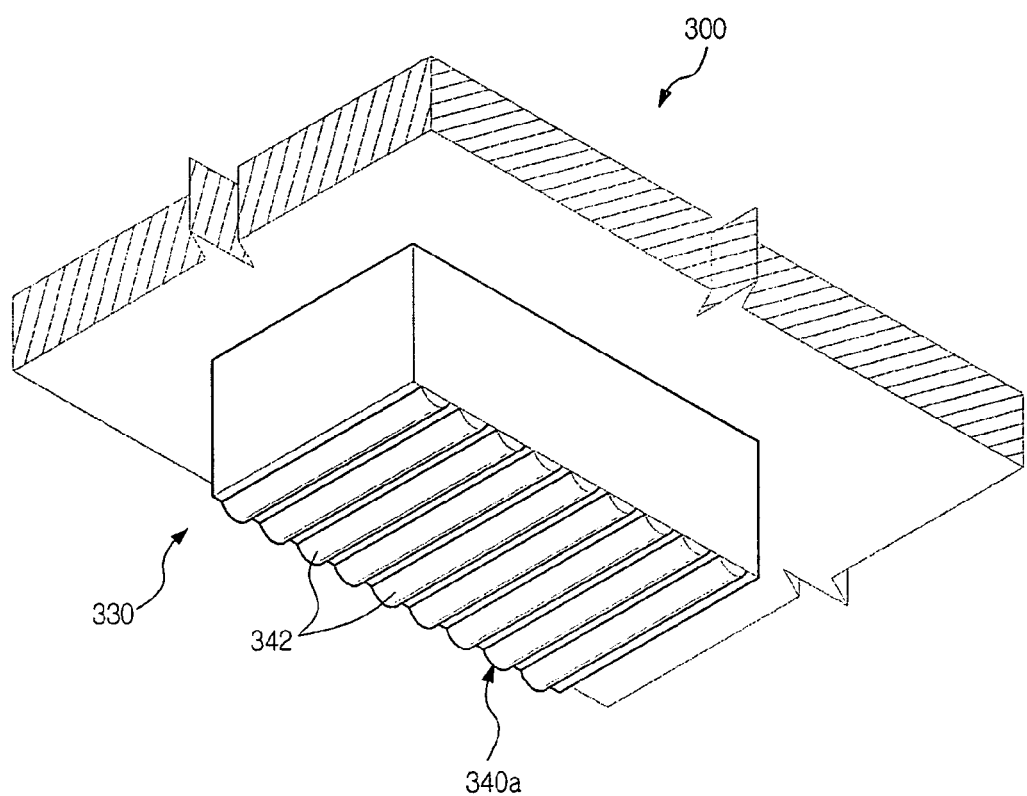
FIGS. 8A to 8C illustrate modifications of a diffusion pattern of a light guide in various embodiments of the present invention.
Figure 8B:
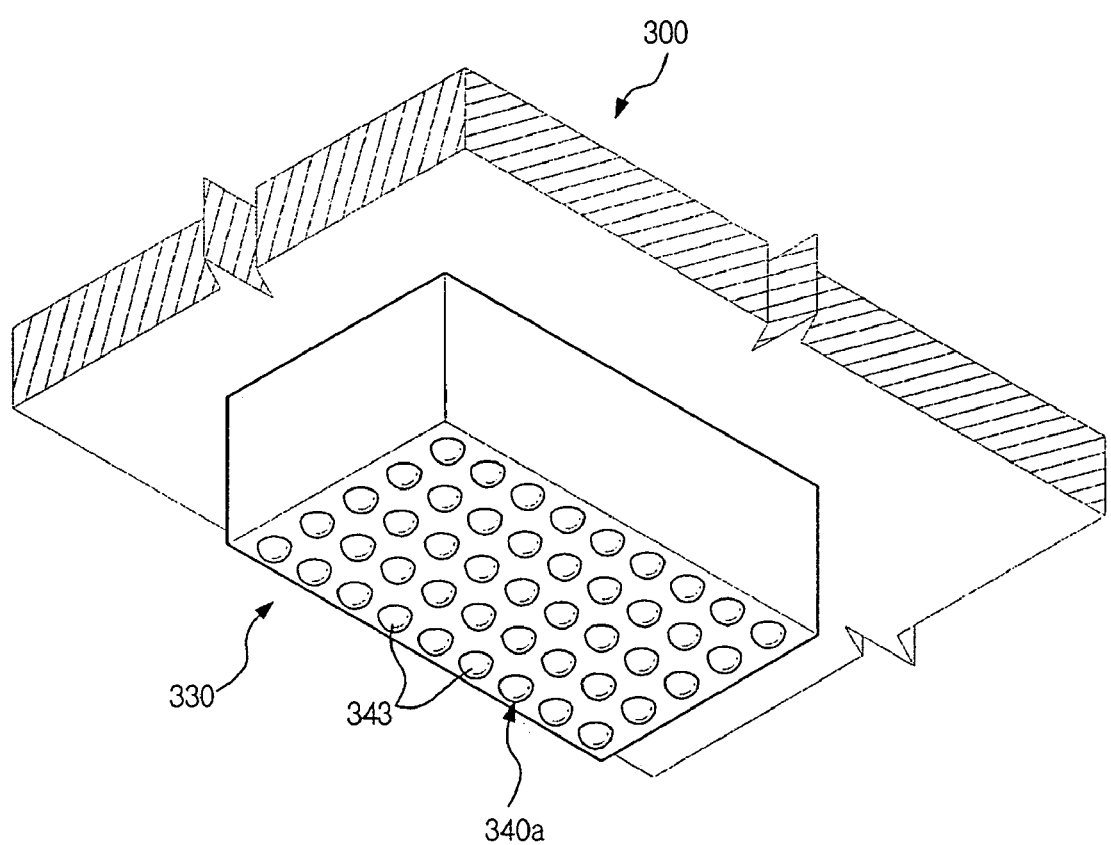
Figure 8C:
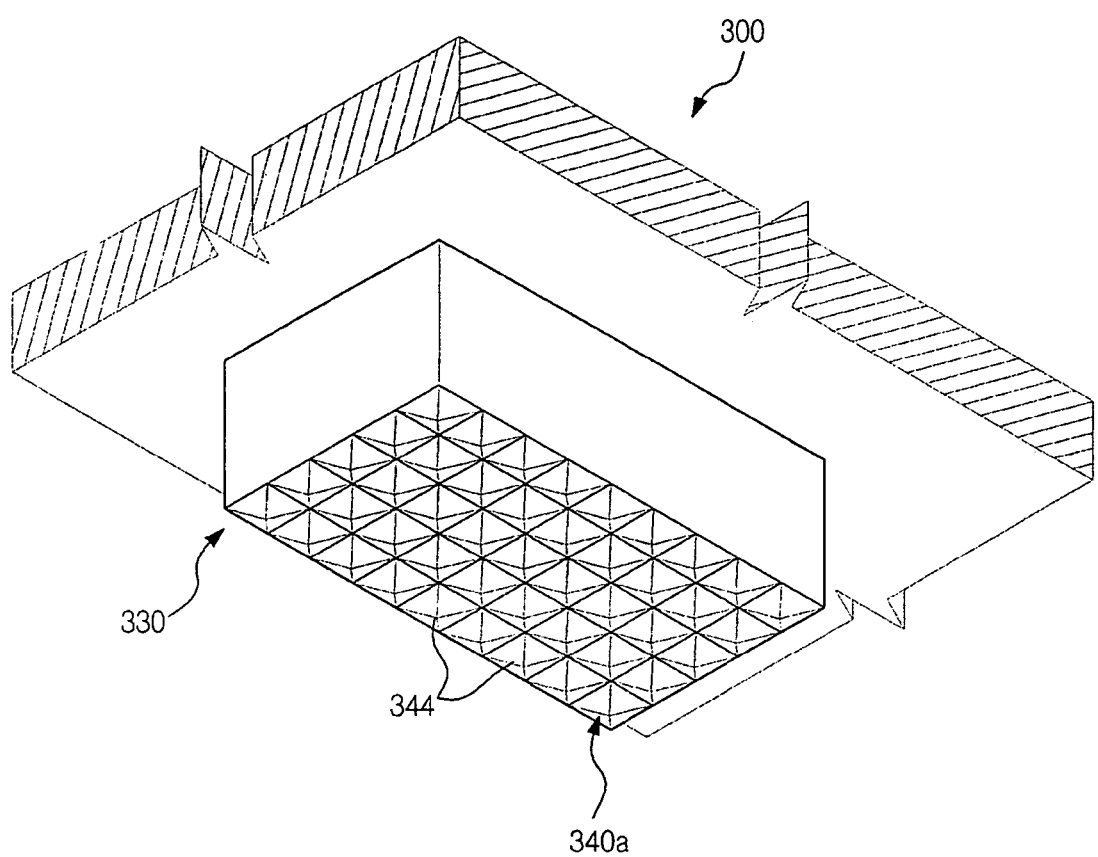

FIGS. 8A to 8C are views illustrating various embodiments of the diffusion pattern of the light guide. As shown in FIG. 8A, a diffusion pattern 340a may be obtained by disposing semi-cylindrical fine patterns 342, extended in the widthwise direction (W direction) of the light guide 300, at intervals (preferably at regular intervals) in the lengthwise direction (L direction) of the light guide 300.

As shown in FIG. 8B, a diffusion pattern 340a may be obtained by disposing hemispheric fine patterns 343, which may be disposed at intervals (preferably at regular intervals) in the lengthwise direction (L direction) and the widthwise direction (W direction) of the light guide 300.

As shown in FIG. 8C, a diffusion pattern 340a may be obtained by disposing pyramid-shaped fine patterns 344. Although FIG. 8C illustrates the fine patterns 344 having a quadrangular pyramid shape, the fine patterns 344 may have a triangular pyramid shape, a conical shape, or other suitable shape.

Figure 9:
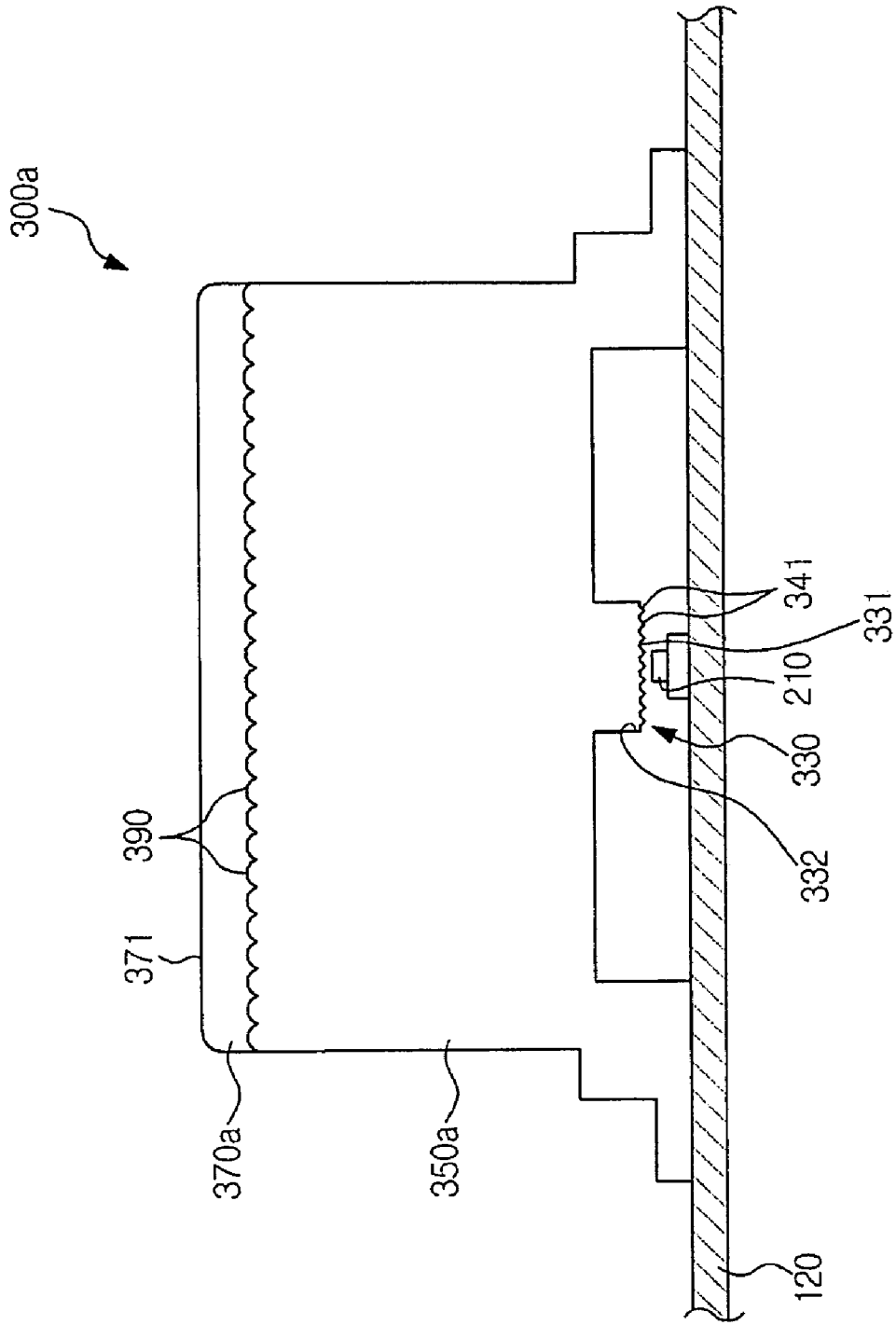
FIG. 9 illustrates a modification of a light guide part and a light emission part of a light guide in one embodiment of the present invention.

FIG. 9 depicts an embodiment of the light guide part and the light emission part of the light guide. As shown in FIG. 9, a light guide 300a may include a light incidence part 330, a light guide part 350a, and a light emission part 370a.

The light incidence part 330 may include a light incidence surface 331 having a diffusion pattern 340a, and a reflecting surface 332, which reflects light diffused by the light incidence surface 331 to a light emission surface 371. The light diffused by the light incidence part 330 may be guided to the light emission part 370a through the light guide part 350a. A portion of the light diffused by the diffusion pattern 340a may be reflected by the reflecting surface 332, and then guided to the light emission part 370a through the light guide part 350a.

The light guide part 350a and the light emission part 370a of the light guide 300a may respectively be made of materials having different refractive indexes. For example, the light guide part 350a may be made of a synthetic resin or other material having a refractive index of approximately 1.5, and the light emission part 370a may be made of a synthetic resin or other material having a refractive index of approximately 1.8.

A diffusion pattern 390, which may diffuse light transmitted from the light guide part 350a to the inside of the light emission part 370a, may form a boundary between the light guide part 350a and the light emission part 370a. In this embodiment, the light passed through the light guide part 350a is diffused to the inside of the light emission part 370a through the diffusion pattern 390, and then is emitted to the outside of the light guide 300a through the light emission surface 371.

Figure 10:
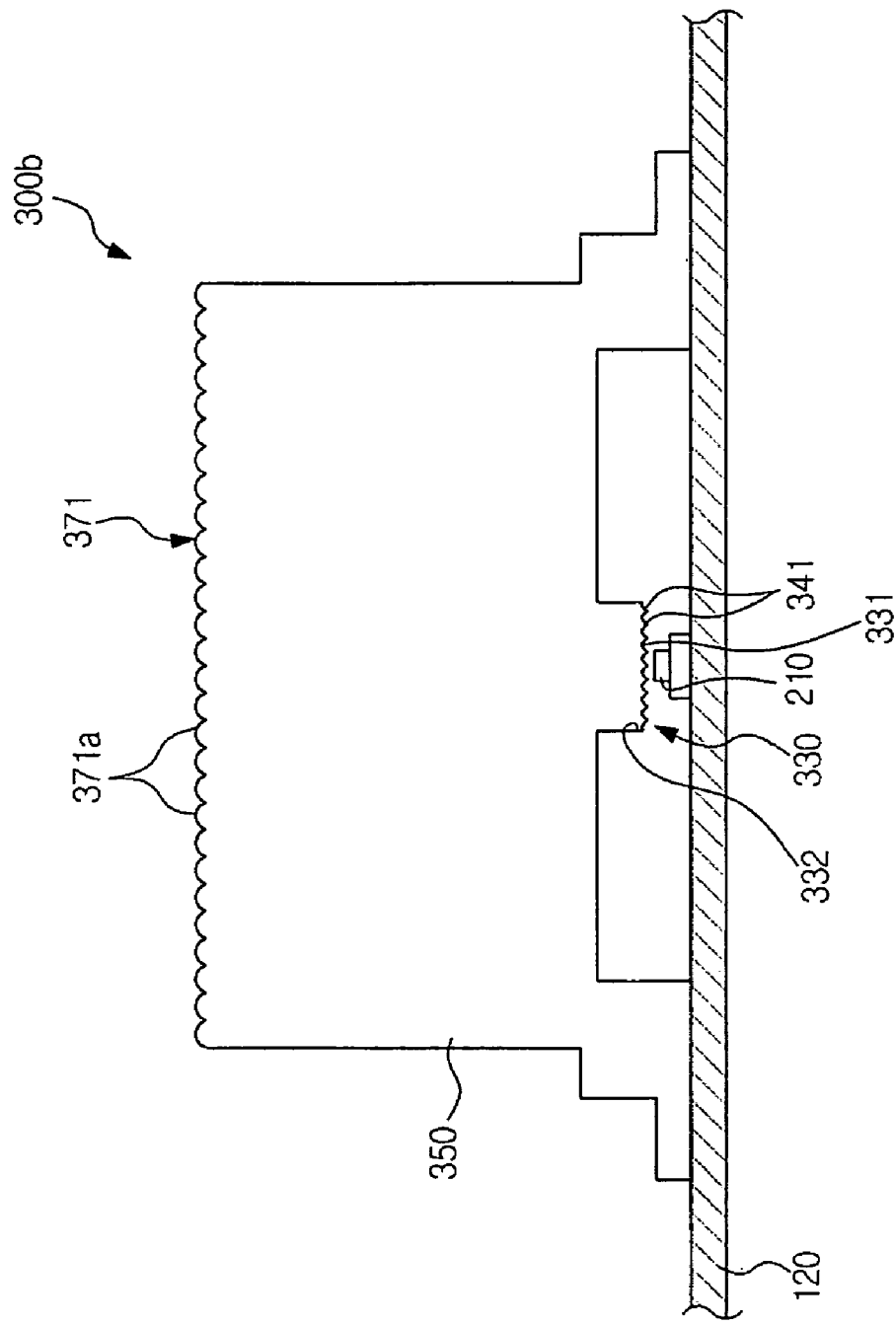
FIG. 10 illustrates a modification of a light emission part of a light guide of one embodiment of the present invention.

FIG. 10 illustrates an embodiment of the light emission part of the light guide of the present invention. As shown in FIG. 10, a light guide 300b may include a light incidence part 330, a light guide part 350, and a light emission surface 371.

The light incidence part 330 may include a light incidence surface 331 having a diffusion pattern 340a, and a reflecting surface 332. The reflecting surface 332 may reflect light diffused by the light incidence surface 331 to the light emission surface 371. In this embodiment, incident light is diffused by the diffusion pattern 340a and then is guided to the light emission surface 371 through the light guide part 350. A portion of the light diffused by the diffusion pattern 340a may be reflected by the reflecting surface 332 and then guided to the light emission surface 371 through the light guide part 350.

The light guide 300b of this embodiment does not have a light emission part that is optically divided from the light guide part 350. Instead, a diffusion pattern 371a is formed on the light emission surface 371 of the light guide 300b. The light transmitted to the light emission surface 371 through the light guide part 350 may be diffused to the outside of the light guide 300 by the diffusion pattern 371a formed on the light emission surface 371.

Although the above embodiments illustrate image forming apparatuses, the present invention may be applied to various electronic products including electric home appliances such as washing machines, air conditioners, refrigerators, etc., or office machines such as computers, scanners, etc.

Although embodiments of the invention have been shown and described, it would be appreciated by those skilled in the art that changes may be made in these embodiments without departing from the principles and spirit of the invention, the scope of which is defined by the claims and their equivalents.

What is claimed is:

1. A display device to display an operational state of an electronics product, comprising:
    a light source configured to produce light; and
    a light guide configured to guide the light received from the light source,
    wherein the light guide comprises:
        a light incidence part including a diffusion structure configured to diffuse the light received from the light source and a reflecting surface configured to reflect the light diffused by the diffusion structure;
        a light emission part including a light emission surface configured to emit the light out of the light guide, and
        a light guide part disposed between the light incidence part and the light emission part, the light guide part to guide the light diffused by the light incident part toward the light emission part,
        wherein the diffusion structure and the reflecting surface of the light incidence part are disposed at a protruding wall protruding from a lower surface of the light guide part to the light source, and
        wherein the light guide part includes a recess to receive the protruding wall of the light guide part, and the light source is disposed to be received in the recess of the light guide part.

2. The display device according to claim 1, wherein the light guide further comprises:
    a light incidence surface facing the light source, the diffusion structure comprising a first diffusion pattern formed on the light incidence surface.

3. The display device according to claim 2, wherein the reflecting surface is inclined to form an obtuse angle with the light incidence surface.

4. The display device according to claim 3, wherein the obtuse angle between the light incidence surface and the reflecting surface is larger than or equal to a sum total of a critical angle, at which total reflection off the reflecting surface occurs, and an angle of 90°.

5. The display device according to claim 2, wherein the first diffusion pattern comprises anyone of a plurality of prism-shaped structures, a plurality of semi-cylindrical shaped structures, a plurality of hemispherical-shaped structures and a plurality of pyramid-shaped structures.

6. The display device according to claim 1, wherein the light emission part comprises a diffusion agent disposed within the light emission part.

7. The display device according to claim 1, wherein the light emission part has a different refractive index from the light guide part.

8. The display device according to claim 2, wherein the light emission surface has formed thereon a second diffusion pattern.

9. The display device according to claim 2, wherein a boundary between the light guide part and the light emission part comprises a second diffusion pattern.

10. The display device according to claim 1, wherein the light source comprises a light emitting diode.

11. An image forming apparatus, comprising:
a main body to form an external appearance of the image forming apparatus and configured to receive a printing device;
a light source supported within the main body; and
a light guide configured to receive light from the light source, and to guide the light toward outside of the main body;
wherein the light guide comprises:
a protruding wall extending toward the light source, the protruding wall including a light incidence surface facing the light source and a reflecting surface, the light from the light source being incident upon the light incident surface;
a light emission part having a light emission surface, through which the light exits the light guide; and
a light guide part disposed between the protruding wall and the light emission part, the light guide part to guide the light from the protruding wall to the light emission part, the light reflecting surface directing the light received through the light incident surface toward the light guide part,
wherein the light guide part includes a recess, and the light source and the protruding wall protruding from a lower surface of the light guide part to the light source are received in the recess of the light guide part, and
wherein the main body includes a display hole into which at least a part of the light guide is inserted, and the light emission surface of the light guide is exposed to the outside of the main body through the display hole.

12. The image forming apparatus according to claim 11, wherein the light incidence surface includes a diffusion pattern diffusing light received from the light source.

13. The image forming apparatus according to claim 12, wherein the diffusion pattern comprises anyone of a plurality of prism-shaped structures, a plurality of semi-cylindrical shaped structures, a plurality of hemispherical-shaped structures and a plurality of pyramid-shaped structures.

14. The image forming apparatus according to claim 11, wherein the reflecting surface is inclined to form an obtuse angle with the light incidence surface.

15. The image forming apparatus according to claim 11, wherein: the light emission part is made of a material having optical characteristics differing from those of the light guide part so as to diffuse the light received from the light guide part.

16. A light guide to guide light received from a light source disposed on a circuit board to an output of a display device, comprising:
a light incidence part including a light incidence surface disposed to face the light source so as to allow the light from the light source to be incident directly upon the light incidence surface and a reflecting surface, the light incidence surface having a diffusion structure formed thereon, the reflecting surface being configured to reflect the light received through the light incident surface so as to direct the light toward an inner portion of the light guide;
a light emission part, through which the light exits from the light guide; and
a light guide part disposed between the light incidence part and the light emission part, the light guide part being configured to guide the light received from the light incidence part to the light emission part,
wherein the light incidence part comprises a protruding wall extending from a lower surface of the light guide part to the light incident surface, the reflecting surface comprising a side wall of the protruding wall, and
wherein the light guide part includes a recess and the light incidence surface of the protruding wall is separated from the circuit board by a predetermined distance and located in the recess so that the light source is received in the recess when the light guide is installed on the circuit board.

17. The light guide of claim 16, wherein the light emission part has different optical characteristics from the light guide part so as to diffuse the light received from the light guide part.

18. The light guide of claim 17, wherein the reflecting surface is inclined to form an obtuse angle with the light incidence surface.

19. The light guide of claim 16, wherein the light emission part comprises a diffusion agent dispersed within the light emission part.

20. The light guide of claim 16, wherein at least one of the light incidence part and the light emission part includes a diffusion pattern that diffuses light.

21. The light guide of claim 20, wherein the diffusion pattern comprises anyone of a plurality of prism-shaped structures, a plurality of semi-cylindrical shaped structures, a plurality of hemispherical-shaped structures and a plurality of pyramid-shaped structure.

22. The light guide of claim 21, distances between each one and a neighboring one of the anyone of a plurality of prism-shaped structures, a plurality of semi-cylindrical shaped structures, a plurality of hemispherical-shaped structures and a plurality of pyramid-shaped structures are substantially the same.

23. The light guide of claim 17, wherein the optical characteristics comprises a refractive index.

* * * * *